United States Patent Office 3,713,811
Patented Jan. 30, 1973

3,713,811
PROCESS FOR PRODUCING ALUMINUM
Charles Toth, Westwego, and Harry Gordon Harris, Jr., Metairie, La., assignors to Applied Aluminum Research Corporation, Westwego, La.
Filed Apr. 29, 1971, Ser. No. 138,663
Int. Cl. C22b 21/02; C01g 45/06
U.S. Cl. 75—68 R      5 Claims

ABSTRACT OF THE DISCLOSURE

In the production of aluminum from the reaction of aluminum trichloride and molten manganese wherein the reaction is carried out under conditions such that manganese dichloride, which is one of the principal by-products of the reaction, is formed as a separate substantially pure liquid phase. This reaction is carried out in a special reactor which is pressure tight, has two pour spouts, and heating means for the aluminum trichloride which is introduced under pressure into the reactor at the bottom.

BACKGROUND OF THE INVENTION

For a great many years, the universally employed process for manufacturing elemental aluminum has been the Bayer-Hall process. This process involves the mixing of bauxite with concentrated sodium hydroxide and the cooking of the mixture at a high temperature and pressure for several hours. The aluminum content of the bauxite dissolves during the cooking to form a pregnant liquor and the pregnant liquor is decanted from the mud, filtered, cooled and diluted. After long (at least 48 hours), continuous agitation of the diluted solution, approximately 50% of the aluminum content of the solution precipitates out as aluminum hydroxide. This aluminum hydroxide is then calcined at approximately 1200° C. and electrically reduced with the help of carbon electrodes and molten cryolite.

This process has a number of significant disadvantages. In the first place, the bauxite employed must be extremely low in silica content (not greater than about 5% by weight), since the silica reacts with alumina and sodium hydroxide to form a sodium aluminosilicate in the form of a rock-like hard scale which tends to clog the equipment. Secondly, large alumina and sodium hydroxide losses result and a huge volume of liquid must be handled to produce a unit quantity of aluminum. Furthermore the Bayer-Hall process has an extremely high energy reqirement not only because the dilute solutions employed must be concentrated by evaporation, but because of the extremely high electrical energy requirement.

In United States patent application Ser. No. 692,036, filed Dec. 20, 1967 and entitled "Process for Producing Aluminum," now Pat. No. 3,615,359, issued Oct. 26, 1971, a process is disclosed which involves the reaction of aluminum chloride with manganese to yield aluminum and manganese dichlororide. The invention disclosed in Pat. No. 3,615,359 is one of the most significant advances in aluminum refining since the discovery of the Bayer-Hall process and provides for the first time in history of the aluminum industry a commercially practicable approach to the production of high quality aluminum by non-electrolytic means. More specifically, that invention broadly involves a cyclic process employing a two-step sequence, the first step involving the reaction of alumina under reducing conditions in the presence of carbon with manganese dichloride to form aluminum trichloride and manganese; and the second step involving the reaction of the aluminum trichloride and manganese at a temperature sufficient to reduce the aluminum trichloride to aluminum, following which the manganese dichloride produced in the latter step is recycled to the first step.

However, when such a two sequence process is performed, the aluminum alloys with the molten manganese thus detracting from the highest possible yield of aluminum. In addition to such detraction from the total yield, the aluminum, when alloyed with the manganese, is in contact with the incoming aluminum trichloride creating an additional problem that aluminum trichloride and aluminum are known to react at high temperatures to form aluminum monochloride and any amount of aluminum monochloride produced detracts from the total net yield of pure aluminum.

The problems encountered in the foregoing process are significantly reduced in accordance with the present invention by carrying out the aluminum trichloride-manganese reaction at elevated pressures in an inventive essentially closed, high-pressure reactor at conditions such that the manganese dichloride formed is in the liquid state.

The advantages of the present invention are, inter alia:
(1) Since the reactor is closed, any recycling of aluminum trichloride is, for practical purposes, eliminated.
(2) Operating at elevated pressure minimizes formation of aluminum monochloride, which detracts from the overall yield of aluminum.
(3) The formation of a separate liquid manganese dichloride phase facilitates separation of this product for subsequent oxidation, reduction, and recycling.
(4) Operation at conditions such as those at which manganese dichloride is formed as a liquid shifts the equilibrium composition such that aluminum of higher purity can be produced.

SUMMARY OF THE INVENTION

In a process for the production of aluminum from the reaction of aluminum trichloride and molten manganese, the improvement comprising the step of carrying out the reaction under conditions such that manganese dichloride formed as a by-product, is formed as a substantially pure liquid. In a recycling operation the resulting manganese dichloride reaction product is oxidized to yield manganese oxides and chlorine which are respectively reacted further to yield manganese and aluminum trichloride.

It is accordingly a principal object of the present invention to provide a process for the reduction of aluminum trichloride to produce substantially pure metallic aluminum. It is a further object of the present invention to provide a process for production of aluminum under conditions such that higher ultimate aluminum purity can result and the principal by-product, manganese dichloride, is formed as a liquid phase.

It is still another important object to provide a novel reactor for carrying out the process, which reactor provides the conditions for maintaining the manganese dichloride in liquid phase and also allows periodic tapping thereof.

These and other important objects and advantages of the present invention will become more apparent in connection with the ensuing description, appended claims, and sheets of drawings.

DETAILED DESCRIPTION OF THE PREFERRED EMBODIMENTS

General process

Figure 1:
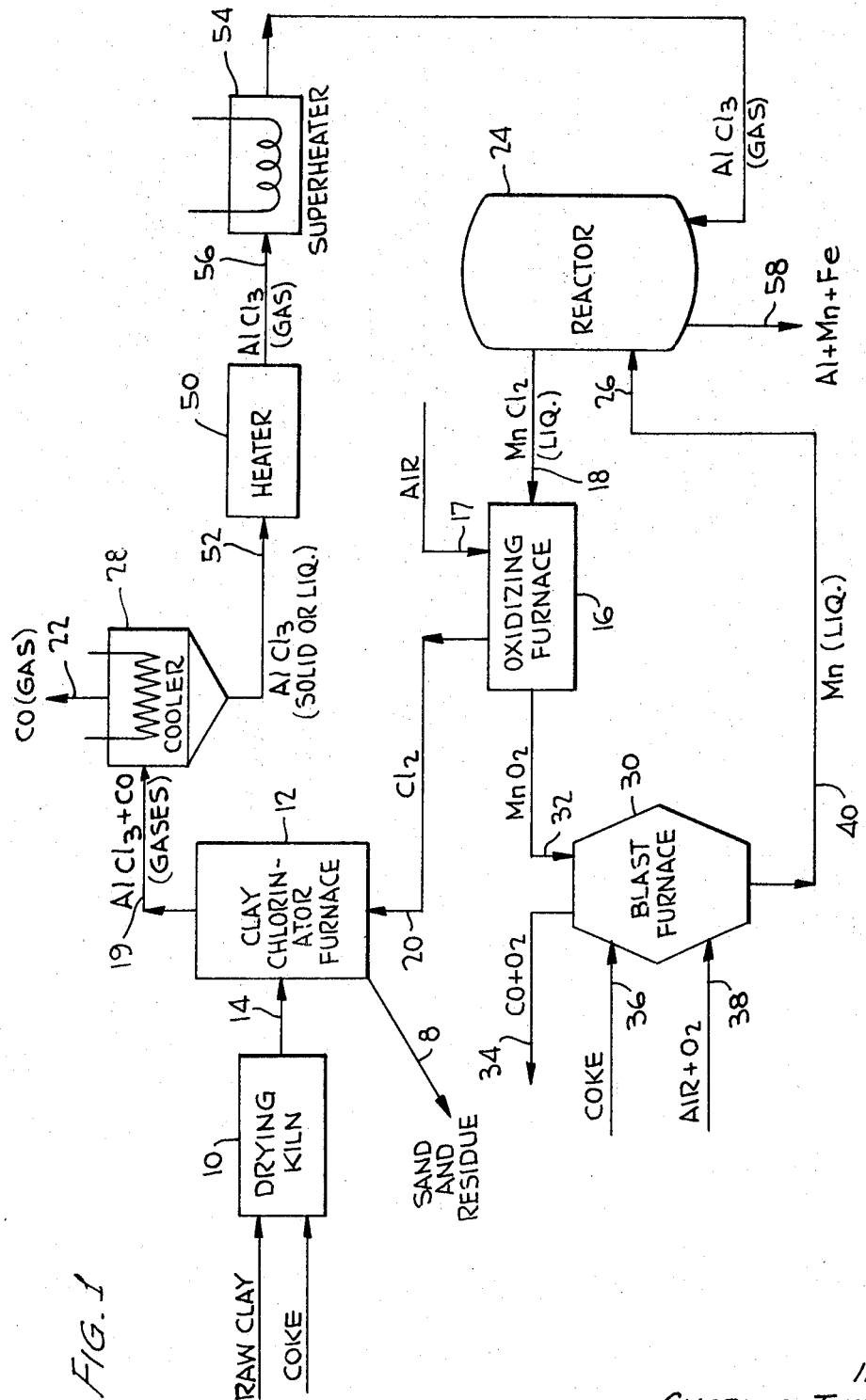
FIG. 1 is a schematic flow diagram of a process for the production of aluminum including the reaction of aluminum trichloride and manganese.

Turning to FIG. 1, there is illustrated the process for the production of aluminum from the reaction of aluminum trichloride and manganese as is basically disclosed in the U.S. patent application above identified and the teachings of which are herein incorporated by reference.

Since the present invention is an improvement of the invention found in this U.S. patent application that process will be described in its most general aspects with relation to FIG. 1 in order to more easily understand the present invention.

An appropriate alumina-containing material, shown in FIG. 1 as raw clay, is mixed with coke and dried in kiln 10. The mixture is then fed into a reactor 12 at 14 for chlorination of the clay.

Manganese dichloride, preferably as a liquid but optionally after solidification as a solid, is introduced in a furnace 16 at 18 together with air at 17. The manganese is oxidized in furnace 16 and after the reaction is completed, chlorine plus excess oxygen and nitrogen are taken off from the furnace and fed into the reactor 12 at 20. The manganese oxides are removed as solids from furnace 16 and are introduced into a blast furnace 30 at 32.

Coke is introduced into the blast furnace 30 at 36 and air as well as perhaps oxygen per se is introduced at 38. After the reaction in the blast furnace 30 has been completed, liquid manganese is withdrawn from the bottom at 40, while carbon monoxide and carbon dioxide plus other gaseous products and reactants escape at 34. The liquid manganese is charged into a reactor 24 at 26.

Returning to the reactor 12, the clay is chlorinated with the chlorine introduced at 20 and sand and residue are withdrawn at 8. The resulting aluminum trichloride and carbon monoxide gas mixture is withdrawn at 19 and cooled in cooler 28 wherein the aluminum trichloride is condensed as a solid if at approximately atmospheric pressure or as a liquid if at elevated pressure (above ~30 p.s.i.g.) while the carbon monoxide is removed as a gas at 22. The aluminum trichloride solid or liquid passes into a heater 50 at 52 where it is converted to a gas which passes into superheater 54 at 56. After passing through superheater 54, the aluminum trichloride passes into the reactor 24.

The aluminum trichloride gas is bubbled up through the liquid manganese in reactor 24 under appropriate reducing conditions to convert as much of the aluminum trichloride as possible to elemental aluminum. By carrying out the reduction reaction in reactor 24 at an appropriate combination of temperature(s) and pressure(s), manganese dichloride may be formed as a liquid phase, which may be removed and recycled as a liquid feed at the desired temperature to furnace 16 at 18. Aluminum along with iron and unreacted manganese is removed from reactor 24 at 58. The iron enters the system from the clay in kiln 10 or the coke in blast furnace 30 and is carried by the $AlCl_3$.

Chemical reactions

The gross reaction which takes place in reactor 24 is as follows:

$$2AlCl_3 + 3Mn \rightarrow 2Al + 3MnCl_2\uparrow$$

As is shown in FIG. 1, the manganese dichloride may be formed and removed as a liquid with the elemental aluminum being drawn off as a liquid. In order to achieve this result it is necessary to operate at suitable conditions of temperature, pressure, and composition. Those conditions are set forth in FIG. 2 and described hereinafter more fully. Any unreacted manganese remaining in reactor 24 is also drawn off as a liquid along with the aluminum. The purity of the resultant aluminum is also dependant upon suitable combinations of temperature, pressure and composition.

Since reactor 24 is operated in an intermittant batch-wise manner, while the other reactors and furnaces 12, 16 and 30 may be operated continuously, a number of reactors 24 may be utilized for each blast furnace 30. The nature and size of the blast furnace will govern optimum operation of the system as a whole and the optimum number of reactors is 4.

The gross reactions which take place in furnace 16 are as follows:

$$MnCl_2 + O_2 \rightarrow MnO_2 + Cl_2\uparrow$$
$$4MnCl_2 + 3O_2 \rightarrow 2Mn_2O_3 + 4Cl_2\uparrow$$
$$2MnCl_2 + O_2 \rightarrow 2MnO + 2Cl_2\uparrow$$

The oxidation state of the manganese product depends on the operating conditions in furnace 16; and any of the above forms of manganese oxide are suitable feed for furnace 30, although the lower oxidation state forms are the most preferred.

The gross reaction which takes place in furnace 12 is as follows:

$$Al_2O_3 + 3C + 3Cl_2 \rightarrow 3CO\uparrow + 2AlCl_3\uparrow$$

The gross reaction which takes place in blast furnace 30 is as follows:

$$MnO_2 + C \rightarrow Mn + CO_2\uparrow$$

It is to be understood that a large number of subreactions may occur in the blast furnace, examples of such reactions being well known to those versed in the art of blast furnace operation and therefore it is not necessary to duplicate them here.

In the process shown in FIG. 1, the reaction in reactor 24 should be carried out until the reaction between the manganese and the aluminum trichloride ceases. This can be determined when the pressure and composition of the reactor stabilize at a given temperature. The reaction is thus terminated and the materials removed from reactor 24.

The mechanism by which the manganese serves to reduce the aluminum trichloride in reactor 24 is believed to be as follows. At the temperatures employed in reactor 24, aluminum trichloride disassociates as follows:

$$AlCl_3 \rightleftharpoons AlCl + 2Cl$$

Since manganese forms a stable chlorine compound ($MnCl_2$) at the temperatures employed in reactor 24, it reacts with the free chlorine formed from the foregoing disassociation to push the equilibrium in the direction of the formation of AlCl. The AlCl is unstable at such temperatures and reacts with the manganese as follows:

$$2AlCl + Mn \rightarrow MnCl_2 + 2Al$$

One disadvantage of the process disclosed in the aforementioned U.S. patent application is that molten manganese dissolves aluminum metal as the aluminum metal is formed from the reaction of aluminum trichloride and manganese. A molten alloy of manganese and aluminum is thus present as the reaction proceeds. In most instances the presence of manganese in the final aluminum product is not undesirable. In fact, it is common practice in the art to add manganese to manganese-free aluminum in order to improve various properties of the aluminum. However, it is desirable to have adequate control of the alloy composition and to be able to achieve aluminum of required purity.

In the previously mentioned patent application, $MnCl_2$ was continuously removed from reactor 24 as a gas. This was desirable in that situation since continuous removal of the $MnCl_2$ caused a shift to the right in the reaction:

$$2AlCl_3 + 3Mn \rightarrow Al + 3MnCl_2$$

However, continuous removal of $MnCl_2$ has serious disadvantages. Removal of gaseous $MnCl_2$ necessitates simultaneous removal of unreacted $AlCl_3$, which, for efficient operation must be recycled.

Furthermore, when aluminum trichloride contacts aluminum at the high temperatures present in the system, the following reaction occurs:

$$AlCl_3 + Al \rightarrow 3AlCl$$

The formation of such gaseous aluminum monochloride is undesirable since it tends to detract from what would otherwise be high yields of aluminum. In addition to detracting from high yields of aluminum, the presence of aluminum monochloride has a deleterious effect on the system as a whole, since aluminum monochloride can plug passageways in the system by combining with carbon and/or oxygen to form aluminum carbide and/or aluminum oxide.

Aluminum monochloride is known to be a very unstable compound. In fact, it is believed that aluminum monochloride can only exist in appreciable amounts at temperatures above 1100° C. Aluminum monochloride being unstable decomposes to yield aluminum and aluminum trichloride at lower temperatures. The aluminum further reacts with the manganese dichloride to form volatile aluminum trichloride, manganese, and/or manganese monochloride. Thus, side reactions create a situation where aluminum and aluminum trichloride are present in parts of the system where their presence is undesirable.

In accordance with the present invention the occurrence and effect of such side reactions is significantly reduced by operating at elevated pressures in a closed reactor 24. In addition, operation at conditions at which $MnCl_2$ is liquid means that its chemical activity is greatly reduced; the effect is thus much the same as continuously removing $MnCl_2$, i.e., the aluminum trichloride-manganese reaction given above is greatly shifted to the right.

The closed system of reactor 24

Figure 2:
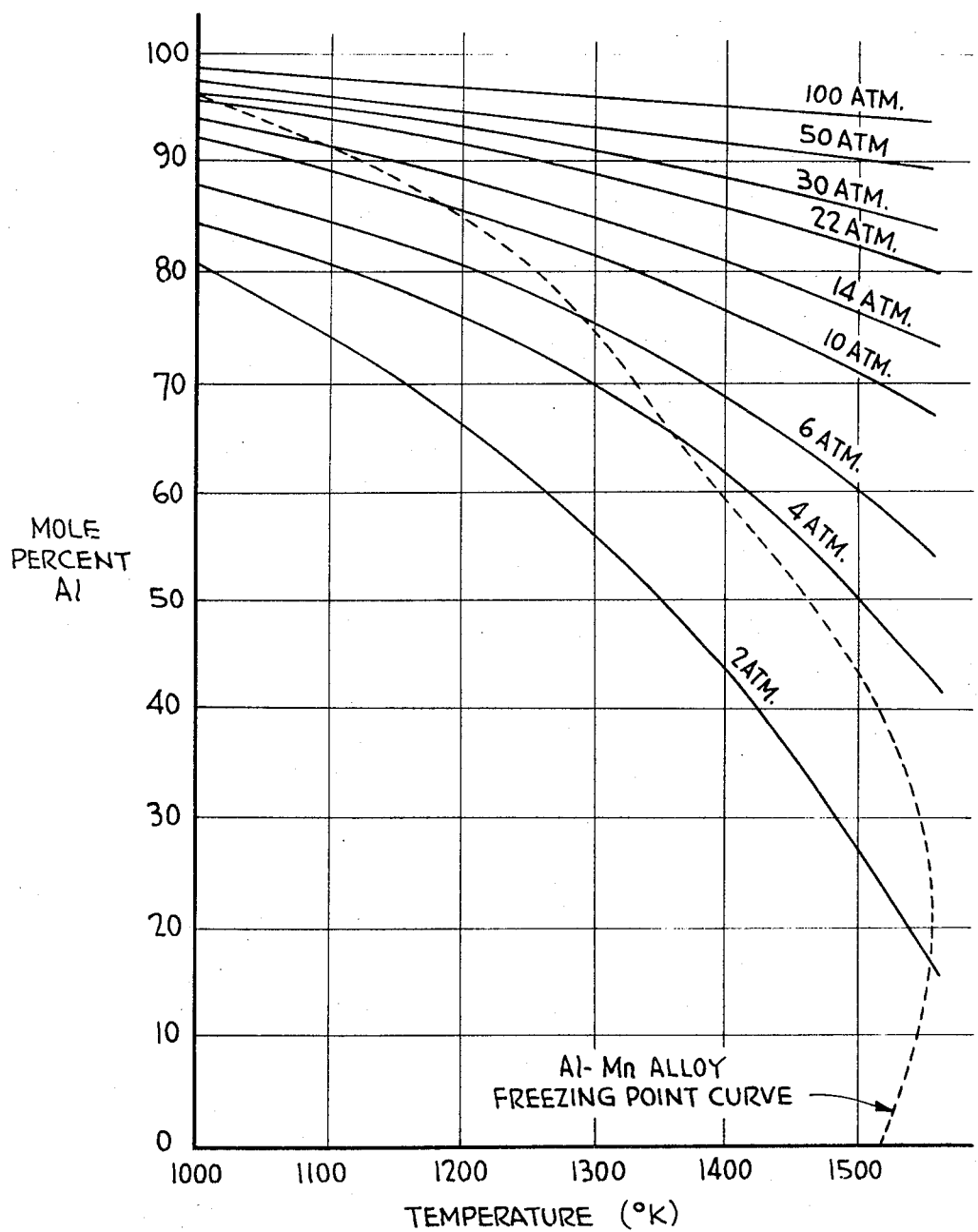
FIG. 2 is an equilibrium curve showing the aluminum content of equilibrium Al-Mn alloy at various pressures as a function of temperature.
Figure 3:
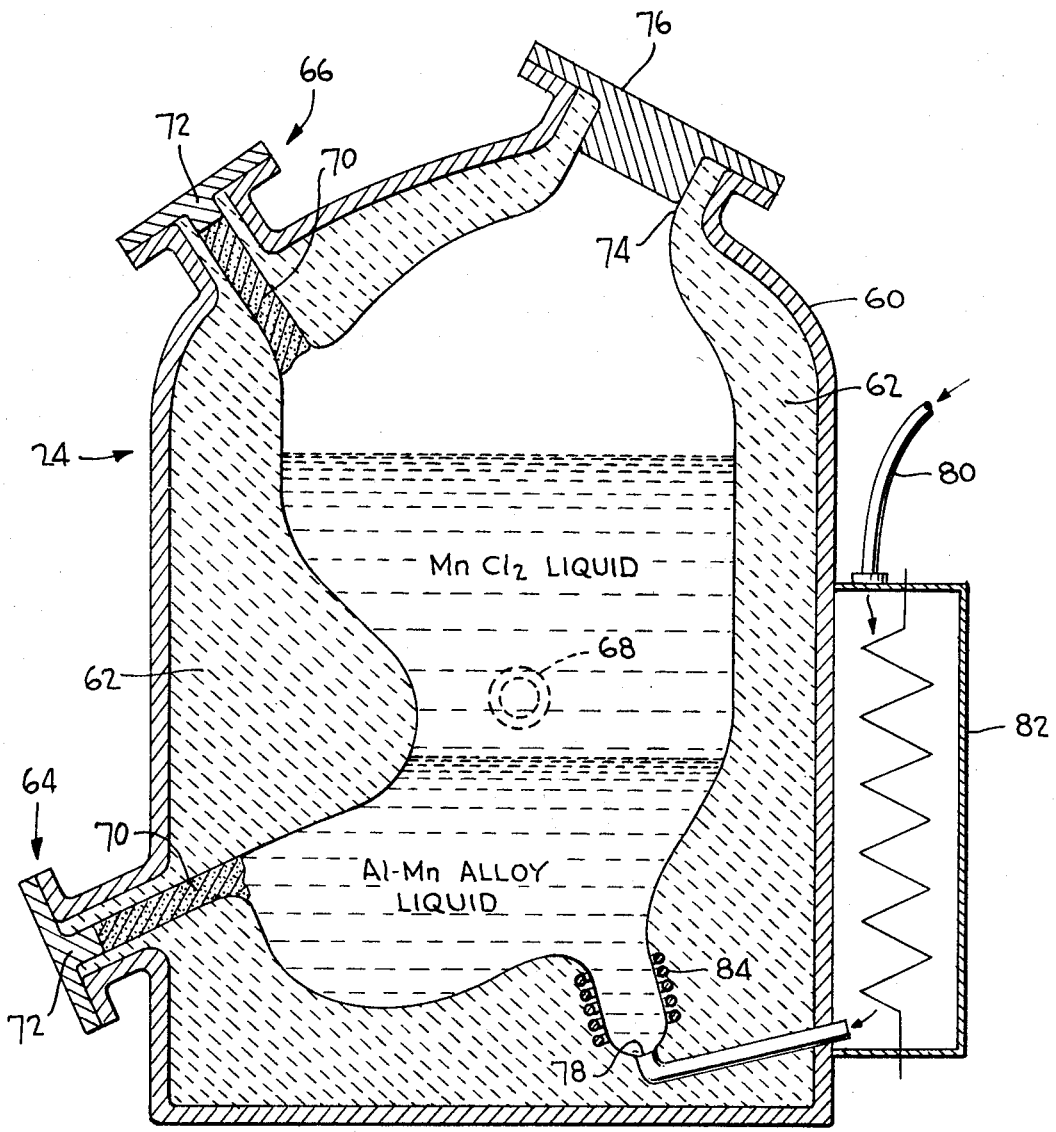
FIG. 3 is an enlarged vertical section of a reactor for the reaction of aluminum trichloride and manganese.

The equilibrium curves in the mole percent Al vs. temperature graph of FIG. 2 gives the Al content of the Al-Mn alloy at various temperatures and pressure. These curves allow control of reactor 24 and gave rise to the unique features as seen in FIG. 3. It is obvious from an inspection of the graph that an increase in pressure and/or a decrease in temperature will result in an alloy with an increased Al content.

The data used in constructing the equilibrium curves were obtained by solving the following two equations simultaneously for the equilibrium alloy composition at specified temperatures and pressures.

$$K_1 = \frac{P_{AlCl_3}}{[Al^2] \cdot P_{AlCl_3}}$$

$$K_2 = \frac{P_{AlCl} \cdot P_{MnCl_2}}{[Mn] \cdot P_{AlCl_3}}$$

$K_1$ and $K_2$ are the equilibrium constants for reactions (1) and (2).

(1)    $2Al_{(liq.)} + AlCl_{3\ (gas)} \rightleftharpoons 3AlCl_{(gas)}$ (2)    $AlCl_{3\ (gas)} + Mn_{(liq.)} \rightleftharpoons MnCl_{2\ (gas)} + AlCl_{(gas)}$ The values of $K_1$ and $K_2$ are temperature dependent and were calculated using the standard free energies of reactions (1) and (2) and the equation $$\Delta F° = -2.303 RT \log K$$

where F° is the standard free energy of reaction, R is the gas constant, and T is the temperature in degrees Kelvin.

The composition of the alloy in terms of mole fraction is symbolized by [Al] and [Mn]. The equilibrium partial pressures of the gas phase components are given by $P_{AlCl}$, $P_{AlCl_3}$, and $P_{MnCl_2}$ and are expressed in units of atmospheres of pressure. The sum of the equilibrium partial pressures equals the total pressure of the system.

FIG. 2 illustrates equilibrium alloy compositions at various temperatures and pressures in the closed system of reactor 24 containing a $MnCl_2$ liquid phase which graphically demonstrates the desirability of operating at a suitable combination of temperature and pressure, and ultimately terminating the reaction at an elevated pressure. For example, in an isothermal system at 1500° K., as the system pressure is increased from 3 atm. to 100 atm., the equilibrium alloy composition in closed reactor 24 increases from about 60 mole percent Al to about 95 mole percent Al. Therefore it will be seen that operating at an elevated pressure causes a substantial increase in the equilibrium conversion to metallic aluminum. In an isobaric closed system, the equilibrium conversion to aluminum is enhanced by low temperatures. For example, at 100 atm. the reduction of temperature from 1500° K. to 1000° K. results in an increase in equilibrium composition from about 95 mole percent Al to about 99 mole percent Al. The advantage of controlling pressure and/or temperature in the closed system of reactor 24 is thus apparent.

Turning now to the operation of reactor 24, it is filled to a predetermined level with molten manganese or an alloy thereof. Aluminum trichloride at an elevated temperature (1000–1400° C.) is pressured into the system from the bottom of reactor 24 and an alloy of aluminum and manganese is formed along with liquid manganese dichloride and a gas phase consisting of aluminum trichloride, aluminum monochloride, manganese dichloride and other gaseous reaction products as well as inerts. The Al-Mn alloy is on the bottom and the gas phase is on top sandwiching the liquid phase of manganese dichloride. The reactor temperature and pressure is altered so as to simultaneously lower the reactor temperature and increase the pressure. The pressure increase occurs by pressuring the $AlCl_3$ into the closed reactor 24. The effect of lower temperature and higher pressure is to increase the equilibrium composition of aluminum in the alloy, thus the effect is to drive the reaction to higher aluminum content alloys. Furthermore, the freezing point of the Al-Mn alloy is lowered as the mole percent Al increases above about 20% as is clearly seen from FIG. 2. This continued lowering of the alloy's freezing point works hand in hand with the principle that the equilibrium concentration of aluminum is increased with higher pressure and lower temperature. The lowering of the freezing point of the alloy also helps to prevent the formation of a solid alloy phase.

The rate at which the reaction can be carried out is determined by a number of factors, including temperature, pressure, composition, size and geometry of the reactor and configuration and number of injection ports for aluminum trichloride. In any event, at high temperatures the chemical reaction is extremely rapid, and to utilize this fact to advantage it may be desirable to carry out initial stages of the reaction at a relatively constant elevated temperature but with slowly increasing reactor pressure. After the pressure reaches a high value (~50–100 atm.) the reactor temperature can be slowly lowered while carrying out the final stages of the reaction. In this manner available reactor volume can be used most efficiently.

It may be desirable to add an inert substance to the alloy phase which would also have the effect of reducing the freezing point of the alloy. Thereby it would be possible to operate at temperatures below the freezing point of the pure Al-Mn alloy. Such inert materials may actually be present in the starting manganese as naturally occurring constituents such as iron, carbon, or other impurities, or the inert materials may be added to the reactor or the reactants. Suitable inert materials are, as mentioned above, iron and carbon as well as hydrogen, zinc, lead and mercury.

It is understood that the presence of an inert material acts as a diluent and will influence the equilibrium chemical composition of the alloy. The following Table I shows the effect of diluted amount on the equilibrium concentration of Al in mole percent at various temperatures and pressures, wherein the mole percent is rounded off to the nearest whole number.

It will be seen from Table I that a high mole percentage of Al compared to the theoretical amount in view of the amount of diluent is possible at low temperature and relatively low pressure. For example, where $X_{Al}+X_{Mn}=0.800$ and the theoretical amount of Al possible is 80 mole percent, at only 10 atm. and 1000° K. there is 76 mole percent of Al or 95% of theoretical.

TABLE I $X_{Al}+X_{Mn}=1.000$

| P (atm.) | T. (° K.) | | | | | |
|---|---|---|---|---|---|---|
| | 1,000 | 1,100 | 1,200 | 1,300 | 1,400 | 1,500 |
| 2 | 82 | 75 | 66 | 56 | 44 | 28 |
| 4 | 86 | 81 | 76 | 70 | 62 | 50 |
| 6 | 90 | 85 | 81 | 76 | 69 | 60 |
| 10 | 93 | 90 | 86 | 82 | 77 | 71 |
| 14 | 96 | 93 | 89 | 86 | 81 | 76 |
| 22 | 97 | 95 | 92 | 89 | 86 | 82 |
| 30 | 97 | 95 | 93 | 91 | 88 | 86 |
| 40 | 98 | 96 | 94 | 92 | 90 | 88 |
| 50 | 98 | 97 | 95 | 93 | 92 | 90 |
| 100 | 99 | 98 | 97 | 96 | 95 | |

$X_{Al}+X_{Mn}=0.975$

| P (atm.) | 1,000 | 1,100 | 1,200 | 1,300 | 1,400 | 1,500 |
|---|---|---|---|---|---|---|
| 2 | 81 | 73 | 64 | 54 | 43 | 30 |
| 4 | 87 | 81 | 74 | 67 | 59 | 50 |
| 6 | 90 | 85 | 80 | 73 | 67 | 60 |
| 10 | 92 | 88 | 84 | 80 | 75 | 70 |
| 14 | 93 | 90 | 87 | 83 | 78 | 75 |
| 22 | 94 | 92 | 89 | 87 | 84 | 82 |
| 30 | 95 | 93 | 91 | 89 | 86 | 84 |
| 40 | | | | | | |
| 50 | 95 | 94 | 93 | 91 | 90 | 89 |
| 100 | | | | | | |

$X_{Al}+X_{Mn}=0.950$

| P (atm.) | 1,000 | 1,100 | 1,200 | 1,300 | 1,400 | 1,500 |
|---|---|---|---|---|---|---|
| 2 | 76 | 69 | 62 | 53 | 42 | 28 |
| 4 | 83 | 78 | 72 | 66 | 58 | 47 |
| 6 | 86 | 82 | 77 | 71 | 66 | 59 |
| 10 | 89 | 86 | 82 | 78 | 73 | 68 |
| 14 | 90 | 87 | 84 | 81 | 77 | 73 |
| 22 | 91 | 89 | 87 | 84 | 81 | 77 |
| 30 | 92 | 90 | 88 | 86 | 84 | 82 |
| 40 | | | | | | |
| 50 | 93 | 92 | 90 | 89 | 87 | 85 |
| 100 | | | | | | |

$X_{Al}+X_{Mn}=0.925$

| P (atm.) | 1,000 | 1,100 | 1,200 | 1,300 | 1,400 | 1,500 |
|---|---|---|---|---|---|---|
| 2 | 75 | 68 | 60 | 51 | 40 | 28 |
| 4 | 82 | 77 | 71 | 64 | 56 | 48 |
| 6 | 85 | 80 | 75 | 70 | 64 | 57 |
| 10 | 86 | 83 | 79 | 75 | 71 | 66 |
| 14 | 88 | 85 | 82 | 79 | 75 | 71 |
| 22 | 89 | 87 | 85 | 82 | 79 | 76 |
| 30 | 90 | 88 | 86 | 84 | 82 | 78 |
| 40 | | | | | | |
| 50 | 90 | 89 | 88 | 86 | 85 | 83 |
| 100 | | | | | | |

$X_{Al}+X_{Mn}=0.900$

| P (atm.) | 1,000 | 1,100 | 1,200 | 1,300 | 1,400 | 1,500 |
|---|---|---|---|---|---|---|
| 2 | 74 | 66 | 58 | 49 | 39 | 24 |
| 4 | 79 | 74 | 68 | 62 | 55 | 44 |
| 6 | 82 | 76 | 73 | 67 | 62 | 54 |
| 10 | 85 | 81 | 77 | 73 | 69 | 63 |
| 14 | 86 | 83 | 80 | 76 | 73 | 69 |
| 22 | 87 | 85 | 82 | 80 | 77 | 74 |
| 30 | 88 | 86 | 84 | 82 | 79 | 77 |
| 40 | | | | | | |
| 50 | 90 | 87 | 86 | 84 | 82 | 81 |
| 100 | | | | | | |

$X_{Al}+X_{Mn}=0.800$

| P (atm.) | 1,000 | 1,100 | 1,200 | 1,300 | 1,400 | 1,500 |
|---|---|---|---|---|---|---|
| 2 | 65 | 58 | 51 | 43 | 34 | 24 |
| 4 | 70 | 65 | 60 | 54 | 47 | 39 |
| 6 | 74 | 69 | 64 | 59 | 54 | 49 |
| 10 | 76 | 72 | 68 | 65 | 61 | 57 |
| 14 | 77 | 74 | 71 | 67 | 64 | 61 |
| 22 | 78 | 76 | 73 | 71 | 68 | 66 |
| 30 | 78 | 76 | 74 | 72 | 70 | 68 |
| 40 | | | | | | |
| 50 | 78 | 77 | 76 | 74 | 73 | 72 |
| 100 | | | | | | |

After completion of the reaction using inert diluents it may prove desirable to remove the aluminum from the diluent by a simple high temperature, low pressure distillation-process. Of course, the particular inert should have a boiling point lower than the Al or Al alloy and in this regard, pure Al has a boiling point of about 2450° C. The reactor itself may also serve as a reboiler in the distillation system. Alternatively, other methods of removal are possible such as fractional crystallization, selective reactions etc.

When used in this disclosure the "reaction zone" is that area of the reactor where the manganese is present for reacting and is usually from the bottom up to the interface of the $MnCl_2$ liquid phase and the Al-Mn molten alloy. Furthermore, "closed system" signifies the sealed chamber within reactor 24.

A closer look is warranted at the inventive closed converter or reactor 24 and which is illustrated in detail in FIG. 3. The reactor consists of an outer metal shell 60, preferably steel, and capable of withstanding internal pressures of up to one hundred or more atmospheres. This shell 60 is lined with a high density high alumina refractory material 62 which is nominally basic and has at least two tap openings 64, 66 from which the reaction products may be tapped. The liquid $MnCl_2$ is tapped out of opening 66 and the final Al-Mn alloy is tapped from opening 64 by means of trunnions 68 on opposite sides of the shell 60 which allow the reactor to be pivoted to selectively pour from either opening. Both openings 64, 66 are stopped with wet mud 70 and caps 72, which mud and caps are removed from the opening to be poured from.

The reactor is filled to a predetermined height with liquid manganese or ferro-manganese through the charge hole 74 which is sealable with a pressure cap 76. Then $AlCl_3$ is pressured into the closed system through aperture 78 in a recess in the bottom. The liquid $AlCl_3$ at a relatively cold temperature (about 200° C.) is pumped at the required pressure through a flexible pressure hose 80 to a preheater 82, which is preferably attached to the reactor, the flexible hose 80 permitting the connection to be unhindered by any pivoting of the reactor for pouring, etc. The $AlCl_3$ is heated in the preheater to about 900–1000° C. at which time the $AlCl_3$ is passed through the refractory material 62 to the aperture 78. The preheater 82 can be gas fired, electrically heated or heated by any other convenient method.

Preferably a superheater 84 surrounds the wall of the bottom of the reactor which defines the recess into which aperture 78 communicates, and this superheater heats the $AlCl_3$ up to as high as 1400° C. The superheater is shown as an induction coil heater, however other alternatives are possible as well, such as a resistance heater, etc.

The reaction produces $MnCl_2$ which is less dense than most of the Al-Mn alloys and consequently the $MnCl_2$ will form a separate liquid phase on top of the molten alloy phase. As the $MnCl_2$ is formed and the volume of the $MnCl_2$ phase increases, it is desirable to periodically tap the $MnCl_2$ through opening 66. This tapping permits a smaller reactor 24 to produce the same amount of alloy.

During the latter stage of the reaction, as higher and higher Al composition alloys are formed, the density of the alloy decreases to a point, depending on the other constituents as well as the temperature, there can be an inversion of phases. The final tapping of the Al-Mn alloy must take this phase inversion into account.

When trying to obtain very high purity aluminum (greater than about 96%) it may be advisable to carry out the last several percent of the reaction in a specially designed, tall, narrow ultra-high pressure, lower temperature reactor. There will be phase inversion at these higher Al purity levels and it will be necessary to introduce the $AlCl_3$ into the reactor at a reduced rate.

EXAMPLE

A closed bessemer convertor or reactor as seen in FIG. 3 capable of holding pressure is initially loaded with 200 tons of liquid ferro-manganese. (The ferro-manganese composition: 88% Mn, 7% C, 5% Fe.) The reactor is loaded until approximately ⅓ of the volume of the lower half section is filled. The temperature of the section of the reactor containing the ferro-manganese is, at least initially, maintained at about 1450° C. The total height of the reaction chamber within the reactor is approximately 20 feet (6.2 meters), with a diameter of 12 feet (3.7 meters). Once the reactor is loaded with the liquid ferro-manganese, aluminum trichloride is fed into the reactor at the bottom at the rate of 1,000 lbs. of gas per minute. The relatively cold (about 200° C.) liquid aluminum trichloride is compressed to 100 p.s.i.g., evaporated, superheated to 1200° C., and then injected into the manganese. The liquid manganese dichloride zone of the crucible can be kept at a temperature slightly below the liquid metal temperature which steadily drifts down, but which is always maintained above the melting point of the Mn-Al alloy. Liquid manganese dichloride can be withdrawn from the reactor continuously or at periodic intervals. In order to make maximum utilization of the reactor space, it is practical and desirable to tap $MnCl_2$ more than once during the conversion operation. As the aluminum concentration increases in the liquid Mn-Al alloy phase, the reactor pressure automatically increases as per the curve in FIG. 2.

When the Al/Mn mole ratio reaches a value of over 10, the $AlCl_3$ feed rate is to be gradually reduced.

The overall operation from start to completion requires about 10 hours. About 72 tons Al-Mn-Fe alloy having a composition of approximately 80% Al was produced.

All the iron content of the ferro-manganese will end up in the aluminum, or alternatively, the operation can be carried out with pure manganese.

Although the invention has been described and illustrated in detail, it is to be understood that this does not delimit the invention. The spirit and scope of this invention is limited only by the language of the appended claims.

What is claimed is:

1. In a process of producing aluminum from aluminum trichloride with manganese in a reaction zone of a reactor, the improvement comprising the steps of sealing said reactor having liquid manganese therein to form a closed system including the reaction zone; introducing aluminum trichloride into said reaction zone, which aluminum trichloride reacts with the manganese to form a molten Al-Mn alloy, a separate liquid phase of manganese dichloride and a gaseous phase of gaseous reaction products; continuing the introduction of aluminum trichloride under sufficient pressure to increase the pressure in the closed system; controllably decreasing the temperature of the reaction zone in conjunction with the increasing pressure to increase the equilibrium concentration of aluminum in the Al-Mn molten alloy; and tapping the molten aluminum when the desired purity has been reached.

2. The process as claimed in claim 1 wherein said reactor has at least one tap hole and comprising the further step of tapping some of the liquid phase manganese dichloride at least once during the process.

3. The process as claimed in claim 1 wherein the pressure and the temperature of the closed system is maintained in accordance with FIG. 2 such that the resulting equilibrium Al-Mn alloy is close to but always on the liquid phase side of the freezing point curve.

4. The process as claimed in claim 1 comprising the further steps of introducing an inert diluent into said closed system so as to favorably influence the equilibrium chemical composition of the Al-Mn alloy.

5. The process as claimed in claim 4 wherein said inert diluent is selected from at least one of the group consisting of iron, carbon, hydrogen, zinc, lead or mercury.

References Cited

UNITED STATES PATENTS

| | | | |
|---|---|---|---|
| 2,452,665 | 11/1948 | Kroll et al. | 75—63 |
| 3,078,159 | 2/1963 | Hollingshead | 75—68 B X |
| 3,137,567 | 6/1964 | McGeer | 75—68 B X |
| 3,615,359 | 10/1971 | Toth | 75—68 R |
| 3,615,360 | 10/1971 | Harris et al. | 75—68 R |

HENRY W. TARRING II, Primary Examiner

U.S. Cl. X.R.

75—68 B, 80; 23—87 R